US007536251B2

United States Patent
Saito et al.

(10) Patent No.: US 7,536,251 B2
(45) Date of Patent: May 19, 2009

(54) MOTOR VEHICLE AND CONTROL METHOD OF MOTOR VEHICLE

(75) Inventors: Kimio Saito, Toyota (JP); Nobuyuki Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 597 days.

(21) Appl. No.: 10/580,244

(22) PCT Filed: Mar. 17, 2006

(86) PCT No.: PCT/JP2006/305904

§ 371 (c)(1), (2), (4) Date: May 22, 2006

(87) PCT Pub. No.: WO2006/098522

PCT Pub. Date: Sep. 21, 2006

(65) Prior Publication Data

US 2009/0043476 A1 Feb. 12, 2009

(30) Foreign Application Priority Data

Mar. 18, 2005 (JP) ............................. 2005-078803

(51) Int. Cl.
*G06F 19/00* (2006.01)
*F02D 41/06* (2006.01)
*G01M 3/04* (2006.01)
*G01M 15/00* (2006.01)

(52) U.S. Cl. ........................ 701/104; 123/480; 123/491; 123/519; 73/114.43; 73/40.5 R

(58) Field of Classification Search ................ 123/447, 123/478, 480, 486, 491, 494, 516, 518–520; 701/101–105, 113–115; 73/40, 40.5 R, 114.43, 73/114.77
See application file for complete search history.

(56) References Cited

U.S. PATENT DOCUMENTS 5,577,482 A * 11/1996 Nakashima et al. ......... 123/491

(Continued)

FOREIGN PATENT DOCUMENTS

JP 07-274301 10/1995

(Continued)

OTHER PUBLICATIONS

Written Opinion of the International Preliminary Examining Authority mailed Mar. 30, 2007.

*Primary Examiner*—Willis R Wolfe, Jr.
(74) *Attorney, Agent, or Firm*—Kenyon & Kenyon LLP

(57) ABSTRACT

In a hybrid vehicle of the invention, when a voltage level E of a low-voltage battery exceeds a preset alert reference value Eth1 (step S115), fueling control activates a negative pressure pump with a preset amount of power consumption for standard fuel vapor treatment (step S125). When the voltage level E of the low-voltage battery exceeds a low charge reference value Elow but is not higher than the preset alert reference value Eth1 (steps S115 and S120), the fueling control activates the negative pressure pump with a smaller amount of power consumption (step S130). When the voltage level E of the low-voltage battery is not higher than the low charge reference value Elow (step S120), the fueling control inactivates the negative pressure pump (step S135). Such control enables at least a voltage of the low charge reference value Elow to be reserved in the low-voltage battery even after regulation of internal pressure of a fuel tank. This effectively prevents an insufficiency of electrical energy by the regulation of the internal pressure of the fuel tank.

21 Claims, 9 Drawing Sheets

U.S. PATENT DOCUMENTS

| | | | |
|---|---|---|---|
| 5,605,136 A * | 2/1997 | Nakashima | 123/480 |
| 5,962,927 A | 10/1999 | Inada et al. | |
| 6,338,336 B1 * | 1/2002 | Iida | 123/674 |
| 6,664,651 B1 | 12/2003 | Kotre et al. | |
| 2002/0079149 A1 | 6/2002 | Kotre et al. | |
| 2002/0083930 A1 | 7/2002 | Robichaux et al. | |
| 2002/0096137 A1 | 7/2002 | Kobayashi et al. | |
| 2004/0173013 A1 | 9/2004 | Kobayashi et al. | |

FOREIGN PATENT DOCUMENTS

| | | |
|---|---|---|
| JP | 2003-214246 A | 7/2003 |
| JP | 2004-156492 | 6/2004 |
| JP | 2004-278409 | 10/2004 |
| JP | 2006-050779 | 2/2006 |

* cited by examiner (a) Normal Position (b) Abnormality Diagnosis Position

MOTOR VEHICLE AND CONTROL METHOD OF MOTOR VEHICLE

This is a 371 national phase application of PCT/JP2006/305904 filed 17 Mar. 2006, claiming priority to Japanese Patent Application No. 2005-078803 filed 18 Mar. 2005, the contents of which are incorporated herein by reference.

TECHNICAL FIELD

The present invention relates to a motor vehicle and a control method of the motor vehicle. More specifically the invention pertains to a motor vehicle having a pressure regulating function in a fuel tank, as well as to a control method of such a motor vehicle.

BACKGROUND ART

A prior art motor vehicle is equipped with a fuel vapor treatment system that causes fuel vapor generated in a fuel tank to be adsorbed and temporarily kept on a canister and supplies the adsorbed fuel vapor into an air intake system of an internal combustion engine to be burned out by the internal combustion engine. A proposed structure of the fuel vapor treatment system includes a sealing valve located between the fuel tank and the canister and a pump located between the canister and the air intake system of the internal combustion engine. For example, a known fuel vapor treatment system disclosed in Japanese Patent Laid-Open Gazette No. 2004-156492 opens the sealing valve during fueling, causes the fuel vapor generated in the fuel tank to be adsorbed on the canister, and controls the internal combustion engine to burn out the adsorbed fuel vapor after a start of the motor vehicle. This system prevents leak of the fuel vapor from a filler neck of the fuel tank during fueling. The prior art motor vehicle also has a function of executing leak diagnosis. The leak diagnosis actuates a pump to introduce a negative pressure into a pathway connecting the fuel tank to the air intake system of the internal combustion engine after elapse of a preset time period since a stop of the motor vehicle and specifies the presence or the absence of any leak hole of the fuel vapor in the pathway, based on a pressure change in the pathway.

In the prior art motor vehicle, the fuel vapor treatment and the leak diagnosis require activation of the fuel vapor treatment system and actuation of the sealing valve and the pump. A supply of electrical energy from an accumulator unit, such as a battery, is generally consumed for activation of the fuel vapor treatment system and actuation of the sealing valve and the pump. Continuation of the fuel vapor treatment and the leak diagnosis in a low state of charge of the accumulator unit may cause an insufficiency of electrical energy and interfere with a start of another required operation of the hybrid vehicle with a supply of electrical energy from the accumulator unit.

DISCLOSURE OF THE INVENTION

An object of the invention is to eliminate the drawbacks of the prior art technique and to provide a motor vehicle that prevents an insufficiency of electrical energy by regulation of an internal pressure of a fuel tank, as well as a corresponding control method of such a motor vehicle.

In order to attain at least part of the above and the other related objects, the present invention is constructed as follows.

The present invention is directed to a motor vehicle including: an internal combustion engine; a fuel tank that stores a fuel, which is to be combusted by the internal combustion engine; an accumulator unit that accumulates electrical energy therein; a measurement unit that measures a state of charge of the accumulator unit; a pressure regulation mechanism that receives a supply of electrical energy from the accumulator unit and regulates an internal pressure of the fuel tank with the received supply of electrical energy; and a pressure regulation control module that controls the regulation of the internal pressure of the fuel tank by the pressure regulation mechanism, based on the state of charge of the accumulator unit measured by the measurement unit on a start of or in the course of the pressure regulation by the pressure regulation mechanism.

The motor vehicle of the invention controls the regulation of the internal pressure of the fuel tank, based on the measured state of charge of the accumulator unit on the start of or in the course of the regulation of the internal pressure of the fuel tank. This arrangement effectively prevents an insufficiency of electrical energy caused by the regulation of the internal pressure of the fuel tank.

In the motor vehicle of the invention, the pressure regulation control module preferably controls the pressure regulation by the pressure regulation mechanism, in order to keep the state of charge of the accumulator unit higher than a preset low charge state. This arrangement enables the state of charge of the accumulator unit to be kept at least higher than the preset low charge state. Here the preset low charge state represents a low charge level that does not make the motor vehicle in a drivable state on a start of the motor vehicle (this definition is also applicable to the subsequent description). In one preferable embodiment of the motor vehicle of the invention, when the state of charge of the accumulator unit measured by the measurement unit decreases below a preset alert charge state, which is higher than the preset low charge state, the pressure regulation control module lowers the electrical energy supplied from the accumulator unit to the pressure regulation mechanism and controls the pressure regulation mechanism to regulate the internal pressure of the fuel tank with the lowered supply of electrical energy. Such control reduces consumption of the electrical energy supplied from the accumulator unit when the state of charge of the accumulator unit decreases below the preset alert charge state. This arrangement enables the pressure regulation by the pressure regulation mechanism to continue with the saved electrical energy. In another preferable embodiment of the motor vehicle of the invention, when the state of charge of the accumulator unit measured by the measurement unit decreases below a preset alert charge state, which is higher than the preset low charge state, or decreases to the preset low charge state, the pressure regulation control module controls the pressure regulation mechanism to stop the pressure regulation. This arrangement enables the state of charge of the accumulator unit to be kept at least the preset low charge state. Here the preset alert charge state represents a total state of charge as a sum of the preset low charge state and an amount of electrical energy required for the regulation of the internal pressure of the fuel tank. Namely the preset alert charge state is higher than the preset low charge state by an amount of electrical energy to be consumed by the regulation of the internal pressure of the fuel tank.

The present invention is also directed to another vehicle including: an internal combustion engine; a fuel tank that stores a fuel, which is to be combusted by the internal combustion engine; an accumulator unit that accumulates electrical energy therein; a measurement unit that measures a state of charge of the accumulator unit; a pressure regulation mechanism that receives a supply of electrical energy from the accumulator unit and regulates an internal pressure of the fuel tank with the received supply of electrical energy; a charging system that is capable of charging the accumulator unit; and a pressure regulation control module that controls the regulation of the internal pressure of the fuel tank by the pressure regulation mechanism and the charging of the accumulator unit by the charging system, based on the state of charge of the accumulator unit measured by the measurement unit on a start of or in the course of the pressure regulation by the pressure regulation mechanism.

The motor vehicle of the invention controls the regulation of the internal pressure of the fuel tank and the charging of the accumulator unit, based on the measured state of charge of the accumulator unit on the start of or in the course of the regulation of the internal pressure of the fuel tank. This arrangement charges the accumulator unit in a low state of charge and thus effectively prevents an insufficiency of electrical energy. The charging system may be a high-voltage power source used to drive the motor vehicle, and the accumulator unit may be a low-voltage power source.

In one preferable embodiment of the motor vehicle of the invention, the pressure regulation control module controls the pressure regulation by the pressure regulation mechanism and the charging of the accumulator unit by the charging system, in order to keep the state of charge of the accumulator unit higher than a preset low charge state, on termination of the pressure regulation by the pressure regulation mechanism. This arrangement enables the state of charge of the accumulator unit to be kept at least higher than the preset low charge state on termination of the regulation of the internal pressure of the fuel tank. When there is a possibility that the state of charge of the accumulator unit decreases to or below the preset low charge state, the pressure regulation control module may control the pressure regulation mechanism and the charging system to regulate the internal pressure of the fuel tank simultaneously with charging the accumulator unit. When there is a possibility that the state of charge of the accumulator unit decreases to or below the preset low charge state, the pressure regulation control module may alternatively control the pressure regulation mechanism and the charging system to interrupt the pressure regulation, start charging the accumulator unit, and allow resumption of the pressure regulation after completion of the charging.

In another preferable embodiment of the motor vehicle of the invention, the pressure regulation control module controls the pressure regulation by the pressure regulation mechanism, in order to apply a negative pressure into the fuel tank at a time of supply of the fuel to the fuel tank. This arrangement effectively prevents an insufficiency of electrical energy caused by the regulation of the internal pressure of the fuel tank during fueling for fuel vapor treatment in the fuel tank.

In still another preferable embodiment of the motor vehicle of the invention, the pressure regulation control module controls the pressure regulation by the pressure regulation mechanism, in order to apply a negative pressure into the fuel tank when the motor vehicle stops in an undrivable state for a preset long time period. This arrangement effectively prevents an insufficiency of electrical energy caused by the regulation of the internal pressure of the fuel tank for leak diagnosis, which specifies the presence or the absence of any leak of the fuel vapor in the fuel tank or in a relevant system, when the preset long time period has elapsed since a stop of the motor vehicle. The long time period is determined empirically as a time required for stabilizing the internal pressure of the fuel tank after a stop of the motor vehicle and may be set in a range of 3 to 7 hours.

In the motor vehicle of the invention, the state of charge of the accumulator unit may represent a voltage level of the accumulator unit, and the measurement unit may be a voltage sensor that measures the voltage level of the accumulator unit.

The present invention is also directed to a control method of a motor vehicle that is equipped with a fuel tank that stores a fuel; an accumulator unit that is charged with electric power and discharges electric power; and a pressure regulation mechanism that receives a supply of electric power from the accumulator unit and regulates an internal pressure of the fuel tank with the received supply of electric power. The control method of the invention includes the steps of: (a) measuring a state of charge of the accumulator unit on a start of or in the course of the regulation of the internal pressure of the fuel tank by the pressure regulation mechanism; and (b) controlling the regulation of the internal pressure of the fuel tank by the pressure regulation mechanism, based on the state of charge of the accumulator unit measured in said step (a).

The control method of the invention controls the regulation of the internal pressure of the fuel tank, based on the measured state of charge of the accumulator unit on the start of or in the course of the regulation of the internal pressure of the fuel tank. This arrangement effectively prevents an insufficiency of electrical energy caused by the regulation of the internal pressure of the fuel tank. The control method may further include the steps for realizing respective functions of the motor vehicle of the invention described above.

The present invention is further directed to a control method of a motor vehicle that is equipped with a fuel tank that stores a fuel; an accumulator unit that is charged with electric power and discharges electric power; a pressure regulation mechanism that receives a supply of electric power from the accumulator unit and regulates an internal pressure of the fuel tank with the received supply of electric power; and a charging system that is capable of charging the accumulator unit. The control method of the invention includes (a) measuring a state of charge of the accumulator unit on a start of or in the course of the regulation of the internal pressure of the fuel tank by the pressure regulation mechanism; and (b) controlling the regulation of the internal pressure of the fuel tank by the pressure regulation mechanism and the charging of the accumulator unit by the charging system, based on the state of charge of the accumulator unit measured in said step (a).

The control method of the invention controls the regulation of the internal pressure of the fuel tank and the charging of the accumulator unit, based on the measured state of charge of the accumulator unit on the start of or in the course of the regulation of the internal pressure of the fuel tank. This arrangement charges the accumulator unit in a low state of charge and thus effectively prevents an insufficiency of electrical energy. The control method may further include the steps for realizing respective functions of the motor vehicle of the invention described above.

BRIEF DESCRIPTION OF THE DRAWINGS

FIG. 3(a) shows normal position and FIG. 3(b) shows abnormality diagnosis position;

BEST MODES FOR CARRYING OUT THE INVENTION

Figure 1:
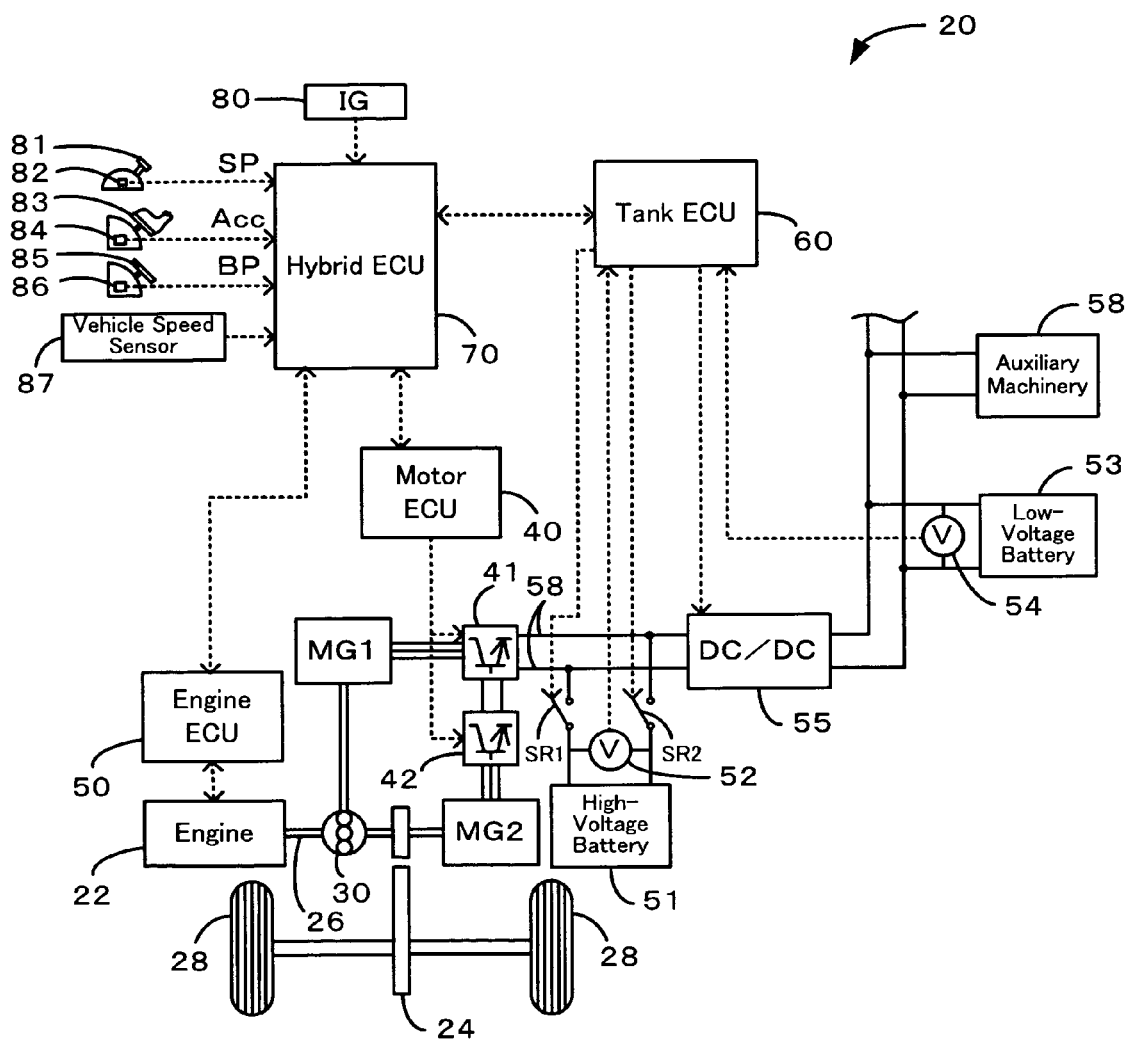
FIG. 1 schematically illustrates the configuration of a hybrid vehicle in one embodiment.
Figure 2:
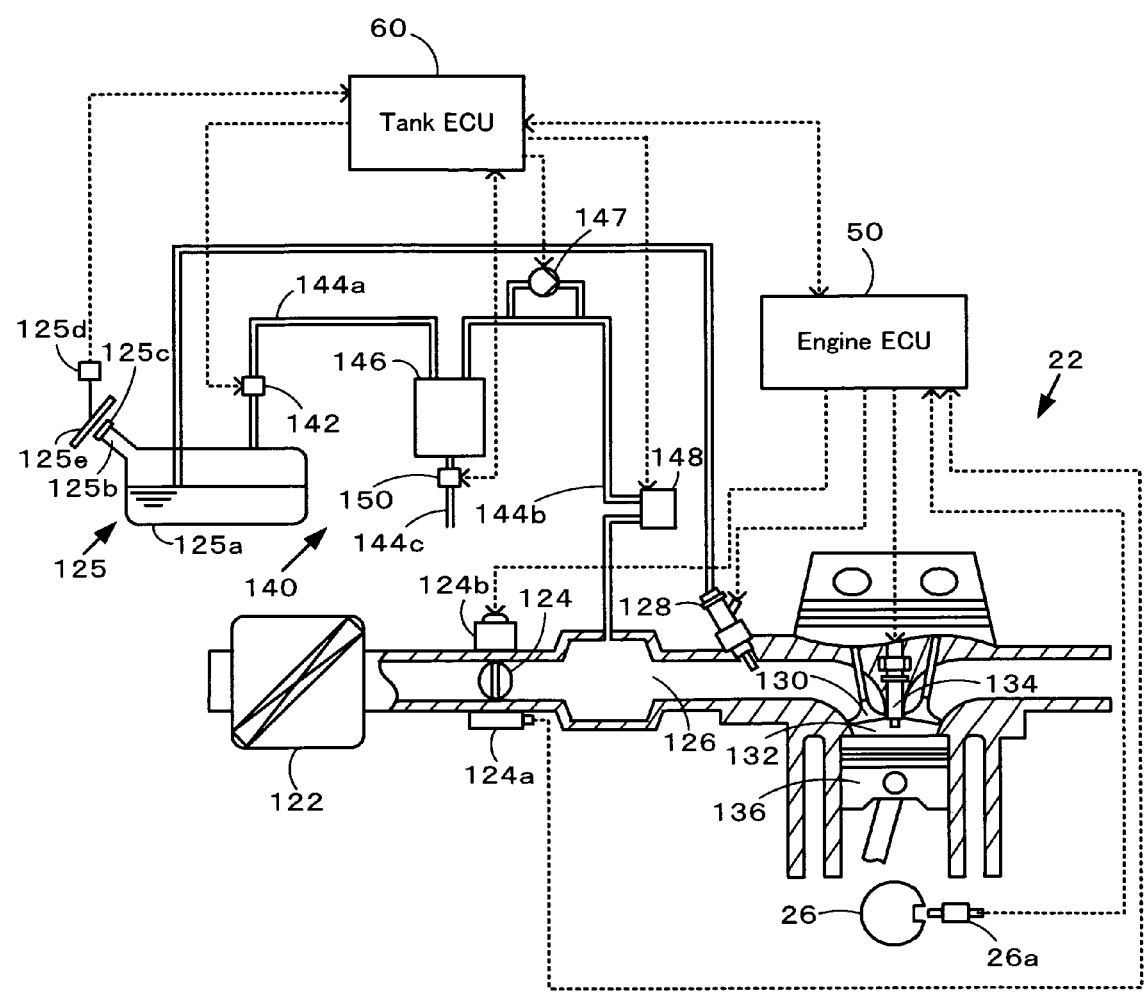
FIG. 2 schematically shows the structure of an engine mounted on the hybrid vehicle.

One mode of carrying out the invention is described below as a preferred embodiment with reference to the accompanied drawings. FIG. 1 schematically illustrates the configuration of a hybrid vehicle 20 in one embodiment of the invention. FIG. 2 schematically shows the structure of an engine 22 mounted on the hybrid vehicle 20 of the embodiment. As illustrated in FIG. 1, the hybrid vehicle 20 of the embodiment includes an engine 22 that is driven with gasoline as a fuel, a three shaft-type power distribution integration mechanism 30 that is connected to a crankshaft 26 or an output shaft of the engine 22, motors MG1 and MG2 that are linked to the power distribution integration mechanism 30 and have power generation capability, a high-voltage battery 51 that transmits electrical energy to and from the motors MG1 and MG2, a low-voltage battery 53 that transmits electrical energy to and from the high-voltage battery 51, an engine electronic control unit 50 (hereafter referred to as the engine ECU 50) that controls the operations of the whole engine system, and a hybrid electronic control unit 70 (hereafter referred to as the hybrid ECU 70) that controls the operations of the whole drive system of the hybrid vehicle 20.

The engine 22 is, for example, an internal combustion engine consuming a hydrocarbon fuel, such as gasoline, to output power. As shown in FIG. 2, the air cleaned by an air cleaner 122 and taken into an intake conduit 126 via a throttle valve 124 is mixed with the fuel supplied from a fuel tank 125 and injected and atomized by a fuel injection valve 128 to the air-fuel mixture. An intake valve 130 is opened to introduce the air-fuel mixture into a combustion chamber 132. The air-fuel mixture introduced in the combustion chamber 132 is ignited with spark of an ignition plug 134 to be explosively combusted. The reciprocating motions of a piston 136 pressed down by the combustion energy of the air-fuel mixture are converted into kinetic energy to rotate the crankshaft 26 and output power. The engine 22 is also equipped with a fuel vapor treatment system 140 that controls the engine 22 to burn out the fuel vapor generated in the fuel tank 125 and purged into the intake conduit 126.

The fuel vapor treatment system 140 has a canister 146 that is filled with an adsorbent, for example, activated carbon, for adsorbing the fuel vapor from the fuel tank 125, a sealing solenoid valve 142 that allows and blocks communication of a tank conduit 144a connecting the canister 146 to the fuel tank 125, a purge solenoid valve 148 that allows and blocks communication of a purge conduit 144b connecting the canister 146 to the intake conduit 126, a negative pressure pump 147 that is placed in a bypass of the purge conduit 144b to introduce a negative pressure into the fuel tank 125, and an abnormality diagnosis module 150 that is provided in an atmosphere conduit 144c connecting the canister 146 to the atmosphere to diagnose an abnormality occurring in the fuel vapor treatment system 140. The fuel vapor treatment system 140 closes both the sealing solenoid valve 142 and the purge solenoid valve 148 in a stop of the engine 22 to prevent the fuel vapor in the fuel tank 125 from being excessively adsorbed onto the canister 146 during parking of the hybrid vehicle 20 and to interfere with the flow of the fuel vapor from the canister 146 into the intake conduit 126 during parking.

The fuel vapor treatment system 140 opens the purge solenoid valve 148 during operation of the engine 22 to introduce the flow of the fuel vapor adsorbed onto the canister 146 together with the flow of the air taken in through the atmosphere conduit 144c into the intake conduit 126 under the negative pressure and controls the engine 22 to burn out the introduced fuel vapor. In the opened position of the purge solenoid valve 148, the sealing solenoid valve 142 is adequately opened and closed to keep the inner pressure of the fuel tank 125 at the level of the atmospheric pressure.

Figure 3:
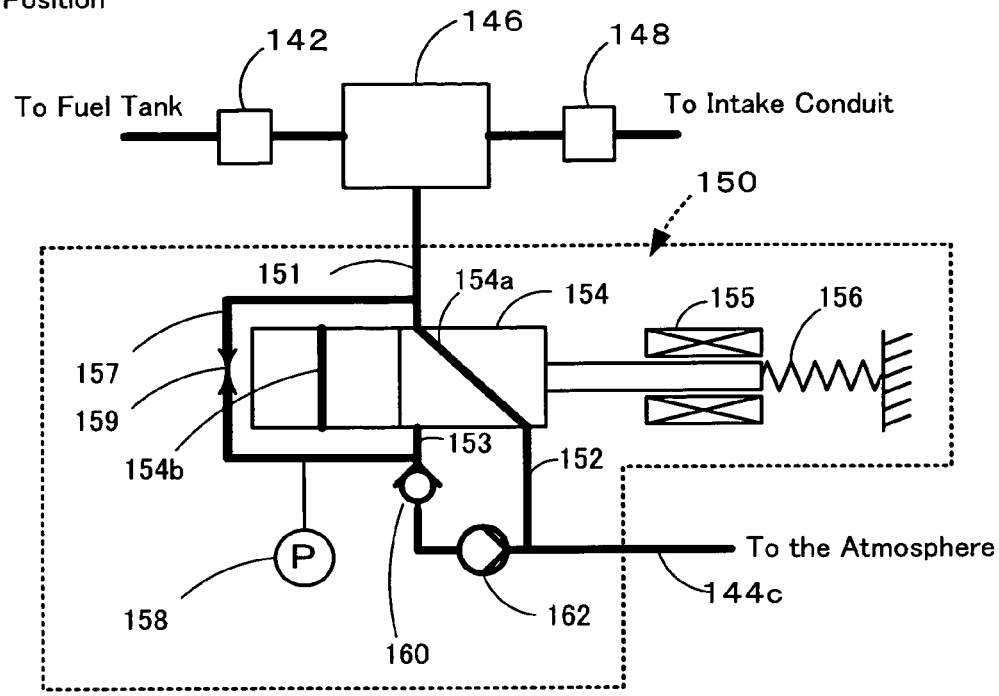
FIG. 3 schematically shows the structure of an abnormality diagnosis module that detects abnormality in a fuel vapor treatment system, where
Figure 3:
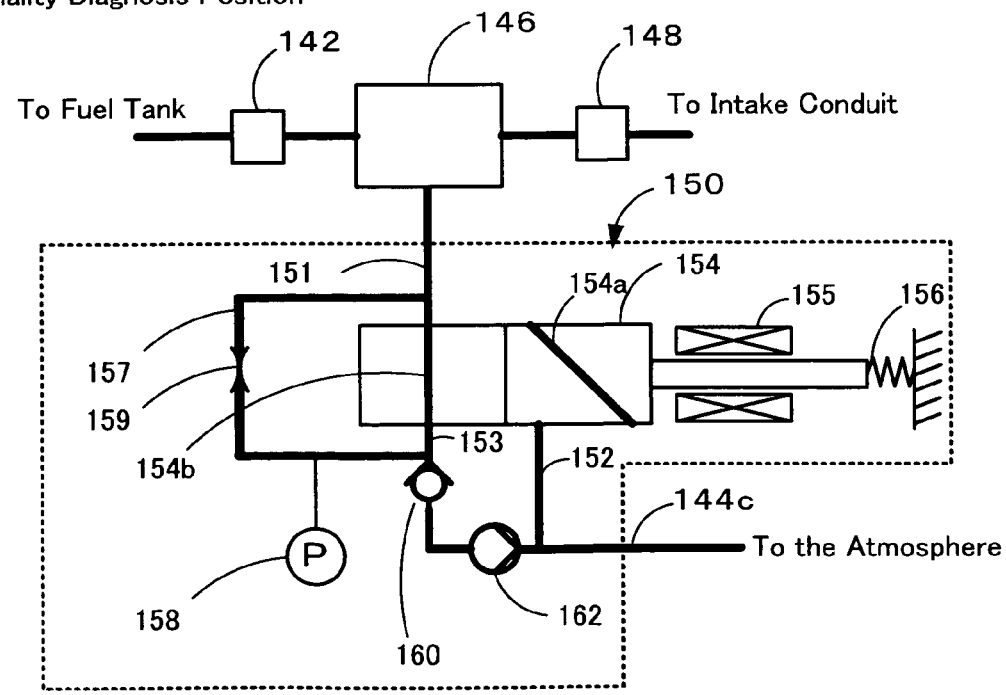

As shown in FIG. 3, the abnormality diagnosis module 150 includes a first path 151 that is provided close to the canister 146, a second path 152 and a third path 153 that are provided close to the atmosphere and are separated from the first path 151, a changeover valve 154 that is located between the first path 151 and the second and third paths 152 and 153, and a bypass 157 that is formed as a detour from the changeover valve 154 to connect the first path 151 to the third path 153. The changeover valve 154 with a solenoid 155 in a non-excited state is set in a normal position that connects the first path 151 to the second path 152 via an atmospheric communication path 154a by the force of a spring 156 as shown in FIG. 3(a). The changeover valve 154 with the solenoid 155 in an excited state is set, on the other hand, in an abnormality diagnosis position that connects the first path 151 to the third path 153 via a negative-pressure introduction path 154b against the force of the spring 156 as shown in FIG. 3(b). The second path 152 and the third path 153 are joined together in the downstream to a combined path. A leak diagnosis pump 162 is provided between connection points of the third path 153 with the bypass 157 and with the second path 152 to apply the negative pressure to the fuel tank 125 via a check valve 160. The midway of the bypass 157 has a pressure sensor 158 to measure the internal pressure and a reference orifice 159 having an inner passage diameter restricted to a reference leak pore diameter, for example, 0.5 mm in diameter. The reference leak pore diameter is given as a standard diameter of a pore determined to have leak of the fuel vapor. The pore diameter of not less than the reference leak pore diameter is determined to cause leak of the fuel vapor, while the pore diameter of less than the reference leak pore diameter is determined to cause no leak of the fuel vapor.

The engine ECU 50 is constructed as a microprocessor (not shown) including a CPU, a ROM that stores processing programs and data, a RAM that temporarily stores data, input and output ports, and a communication port. As shown in FIG. 2, the engine ECU 50 receives, via its input port, data from various sensors measuring and detecting the operating conditions of the engine 22, for example, a crank angle and an engine rotation speed Ne measured as a rotational position and rotation speed of the crankshaft 26 from a crank angle sensor 26a and a throttle position or an opening of the throttle valve 124 from a throttle position sensor 124a. The engine ECU 50 outputs, via its output port, diverse control signals and driving signals to actuators for the operations of the engine 22, for example, driving signals to the fuel injection valve 128, driving signals to a throttle motor 124b to regulate the opening of the throttle valve 124, and control signals to the ignition plug 134. The engine ECU50 establishes communication via its communication port with the hybrid ECU 70 to drive and control the engine 22 in response to control signals received from the hybrid ECU 70 and to send data regarding the operating conditions of the engine 22 to the hybrid ECU 70 according to the requirements.

As shown in FIG. 2, the fuel tank 125 has a tank main body 125a for storing the fuel, a filler neck 125b for filling the tank main body 125a with the fuel, and a screw cap 125c for sealing the filler neck 125*b*. A lid 125*e* is formed on the vehicle body at a position facing the cap 125*c*. The lid 125*e* is opened by the operator's manipulation of a lid opener (not shown) located in the vicinity of the driver's seat and is manually closed. A lid open-close detection sensor 125*d* is provided near to the lid 125*e* to detect the open-close state of the lid 125*e*. The operator manipulates the lid opener to open the lid 125*e*, removes the screw cap 125*c* from the filler neck 125*b*, and inserts a fueling gun into the filler neck 125*b* to start fueling. On completion of fueling, the operator pulls the fueling gun out of the filler neck 125*b*, screws the screw cap 125*c* into the filler neck 125*b*, and manually closes the lid 125*e*.

The motors MG1 and MG2 are constructed as known synchronous motor generators that may be actuated both as a generator and as a motor. The motors MG1 and MG2 transmit electric powers to and from the high-voltage battery 51 via inverters 41 and 42 as shown in FIG. 1. Both the motors MG1 and MG2 are driven and controlled by a motor electronic control unit 40 (hereafter referred to as motor ECU 40). The motor ECU 40 inputs signals required for drive control of the motors MG1 and MG2, for example, signals representing rotational positions of rotors in the motors MG1 and MG2 from rotational position detection sensors (not shown) and signals representing phase currents, which are to be applied to the motors MG1 and MG2, from electric current sensors (not shown) The motor ECU 40 outputs switching control signals to the inverters 41 and 42. The motor ECU 40 establishes communication with the hybrid ECU 70 to drive and control the motors MG1 and MG2 in response to control signals received from the hybrid ECU 70 and to send data regarding the driving conditions of the motors MG1 and MG2 to the hybrid ECU 70 according to the requirements.

The high-voltage battery 51 is a nickel hydrogen battery in this embodiment and transmits electrical energy to and from the motors MG1 and MG2 via the inverters 41 and 42. As shown in FIG. 1, the high-voltage battery 51 is connected with a DC-DC converter 55 to convert a high voltage to a low voltage. Electrical energy is supplied from the high-voltage battery 51 to the low-voltage battery 53 via the DC-DC converter 55. The DC-DC converter 55 is driven and controlled to lower a dc voltage supplied by the high-voltage battery 51. The lowered dc voltage is accumulated in the low-voltage battery 53. Namely the low-voltage battery 53 is charged by the high-voltage battery 51. The state of charge SOC of the high-voltage battery 51 is computed by the hybrid ECU 70 from the accumulated charge-discharge current of the high-voltage battery 51 measured by an electric current sensor (not shown).

The low-voltage battery 53 is a lead acid battery in this embodiment. The low-voltage battery 53 supplies electrical energy to auxiliary machinery 58 mounted on the hybrid vehicle 20 to actuate the auxiliary machinery 58, and supplies electrical energy to the hybrid ECU 70 in response to ON signals from an ignition switch 80 to activate the hybrid ECU 70. The low-voltage battery 53 also supplies electrical energy to the tank ECU 60, the sealing solenoid valve 142, and the negative pressure pump 147 in response to ON signals from the lid open-close detection sensor 125*d*, and supplies electrical energy to the tank ECU 60, the changeover valve 154, and the leak diagnosis pump 162 after elapse of a preset time.

Figure 4:
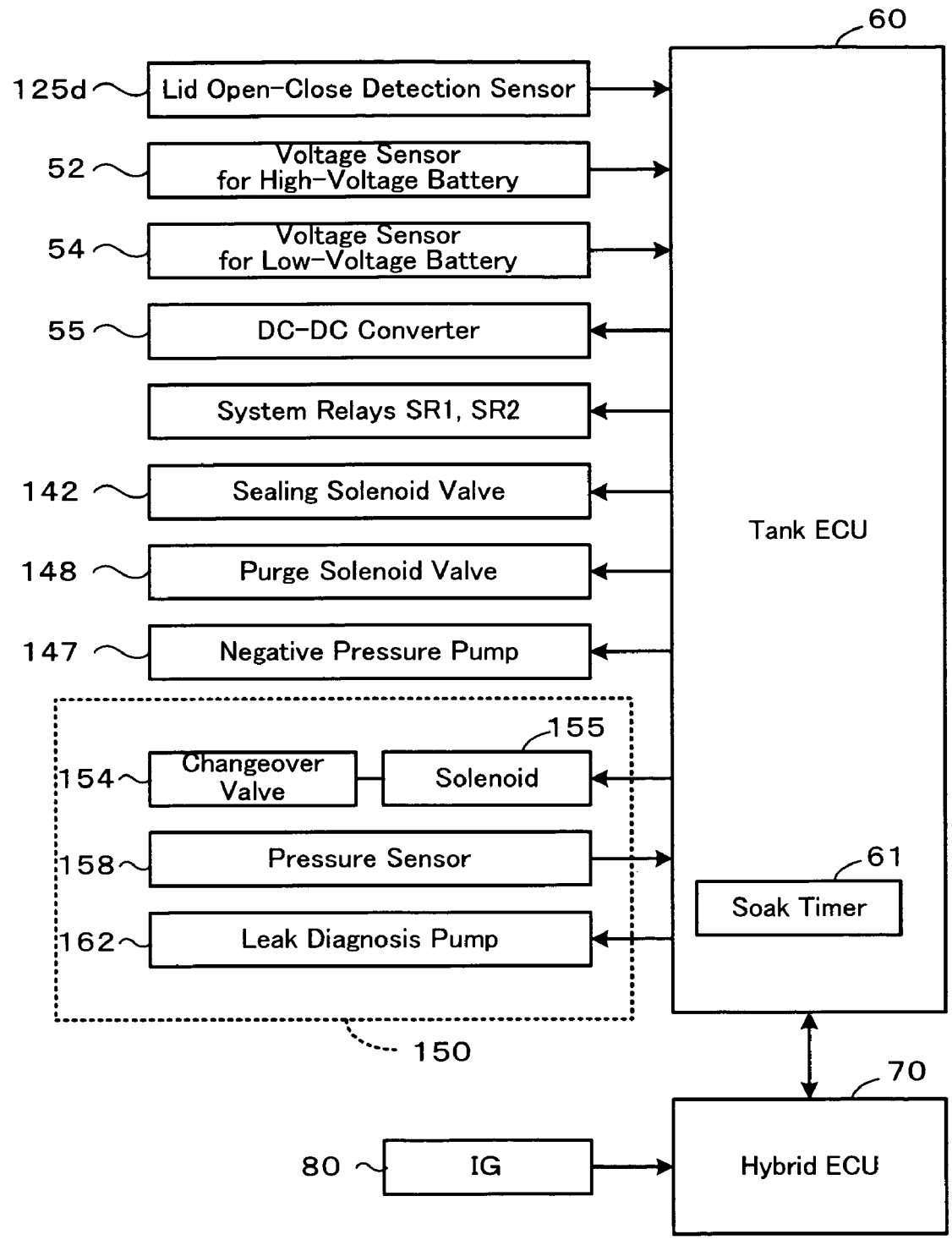
FIG. 4 is a block diagram showing input and output of signals to and to and from a tank ECU.

The tank ECU 60 drives and controls the fuel vapor treatment system 140 and the abnormality diagnosis module 150 and is constructed as a microprocessor (not shown) including a CPU, a ROM that stores processing programs and data, a RAM that temporarily stores data, input and output ports, and a communication port. With reference to FIG. 4, the tank ECU 60 has a soak timer 61 that counts the time elapsed since a stop of the hybrid vehicle 20. The tank ECU 60 receives, via its input port, a detection signal representing the open-close state of the lid 125*e* from the lid open-close detection sensor 125*d*, an inter-terminal voltage from a voltage sensor 52 located between terminals of the high-voltage battery 51, an inter-terminal voltage from a voltage sensor 54 located between terminals of the low-voltage battery 53, and a pressure value from the pressure sensor 158 included in the abnormality diagnosis module 150. The tank ECU 60 also inputs ON-OFF signals from the ignition switch 80 via the hybrid ECU 70. The tank ECU 60 outputs, via its output port, various driving signals and control signals, for example, driving signals to drive the DC-DC converter 55, control signals to switch on and off system relays SR1 and SR2, driving signals to the sealing solenoid valve 142 and the purge solenoid valve 148, driving signals to the negative pressure pump 147, control signals to the solenoid 155 for operating the changeover valve 154 included in the abnormality diagnosis module 150, and driving signals to the leak diagnosis pump 162 included in the abnormality diagnosis module 150. The tank ECU 60 establishes communication with the hybrid ECU 70 to receive and send diverse control signals and data from and to the hybrid ECU 70.

The hybrid ECU 70 is constructed as a microprocessor (not shown) including a CPU, a ROM that stores processing programs, a RAM that temporarily stores data, input and output ports, and a communication port. The hybrid ECU 70 receives, via its input port, ON-OFF signals from the ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 87 as shown in FIG. 1. The hybrid ECU 70 is connected via its communication port with the engine ECU 50, the motor ECU 40, and the tank ECU 60 to send and receive various control signals and data to and from the engine ECU 50, the motor ECU 40, and the tank ECU 60. The hybrid ECU 70 is activated to start the hybrid vehicle 20 by supply of a predetermined amount of electrical energy from the low-voltage battery 53 in response to an ON signal of the ignition switch 80.

Figure 5:
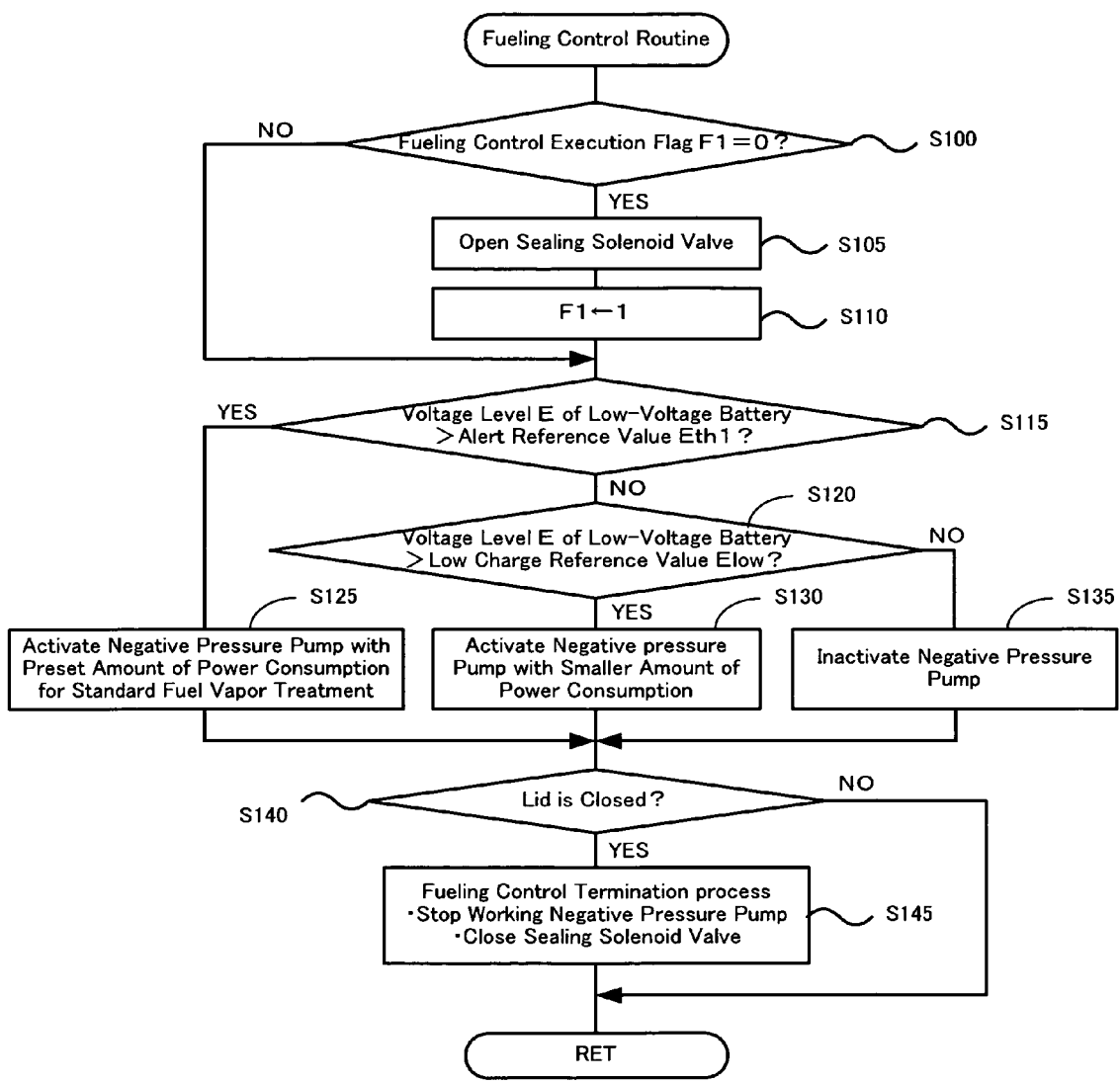
FIG. 5 is a flowchart showing a fueling control routine.

The description regards the operations of the hybrid vehicle 20 of the embodiment having the configuration discussed above, especially a series of fuel vapor treatment control for adequate treatment of the fuel vapor in the fuel tank 125 during fueling. FIG. 5 is a flowchart showing a fueling control routine executed in the hybrid vehicle 20. The tank ECU 60 receives a supply of electrical energy from the low-voltage battery 53 and executes this fueling control routine at preset timings, for example, at every several msec, after output of a detection signal representing the open state of the lid 125*e* from the lid open-close detection sensor 125*d* in response to the operator's manipulation of the lid opener to open the lid 125*e*. In the fueling control routine of FIG. 5, the tank ECU 60 first identifies whether a fueling control execution flag F1 is equal to 0 or 1 (step S100). The setting of the fueling control execution flag F1 specifies execution or non-execution of the fueling control by the tank ECU 60. The fueling control execution flag F1 reset to 0 represents non-execution of the fueling control, whereas the fueling control execution flag F1 set to 1 represents execution of the fueling control.

Upon identification of the fueling control execution flag F1 equal to 0 at step S100, the tank ECU 60 opens the sealing solenoid valve 142 (step S105) and sets the fueling control execution flag F1 equal to 1 (step S110). The fuel tank 125 is then connected to the canister 146 via the tank conduit 144a to lead the flow of fuel vapor in the fuel tank 125 through the tank conduit 144a to the canister 146. In this state, the changeover valve 154 included in the abnormality diagnosis module 150 is set in the normal position to connect the atmosphere conduit 144c of the canister 146 to the atmospheric communication path 154a to make the canister 146 in communication with the atmosphere.

Upon identification of the fueling control execution flag F1 equal to 1 at step S100 or after setting the fueling control execution flag F1 equal to 1 at step S110, the tank ECU 60 compares a voltage level E of the low-voltage battery 53 measured by the voltage sensor 54 with a preset alert reference value Eth1 (step S115). The alert reference value Eth1 is empirically determined as a sum of a required minimum starting voltage E0 and a voltage equivalent to an amount of electric power required for the standard fuel vapor treatment. The required minimum starting voltage E0 represents a minimum voltage demand to activate the hybrid ECU 70 and restart the hybrid vehicle 20 in a drivable state. The alert reference value Eth1 may be set, for example, in a range of 9 to 11 V. When the voltage level E of the low-voltage battery 53 is higher than the preset alert reference value Eth1 at step S115, it is ensured that the low-voltage battery 53 has the required minimum starting voltage E0 even after the standard fuel vapor treatment. The tank ECU 60 accordingly activates the negative pressure pump 147 with a preset amount of power consumption for the standard fuel vapor treatment (step S125).

When the voltage level E of the low-voltage battery 53 is not higher than the preset alert reference value Eth1 at step S115, on the other hand, the tank ECU 60 subsequently compares the voltage level E of the low-voltage battery 53 with a low charge reference value Elow (step S120). The low charge reference value Elow is determined to be slightly higher than the required minimum starting voltage E0 and may be set in a range of 6 to 8 V. When the voltage level E of the low-voltage battery 53 is higher than the low charge reference value Elow at step S120, the tank ECU 60 specifies the amount of electric power to be supplied from the low-voltage battery 53 to the negative pressure pump 147 (that is, the amount of power consumption) corresponding to a difference $\Delta E$ between the current voltage level E of the low-voltage battery 53 and the required minimum starting voltage E0, and activates the negative pressure pump 147 with the specified amount of power consumption (step S130). The amount of power consumption used for the fuel vapor treatment is restricted to or below an amount of electric power equivalent to the difference $\Delta E$. Namely the greater difference $\Delta E$ gives the higher amount of power consumption and the smaller difference $\Delta E$ gives the lower amount of power consumption. The amount of power consumption specified in this state is to be lower than the preset amount of power consumption for the standard fuel vapor treatment. When the voltage level E of the low-voltage battery 53 is not higher than the low charge reference value Elow at step S120, on the other hand, there is a fear that a further decrease in voltage level E of the low-voltage battery 53 leads to no reserve of the required minimum starting voltage E0. The tank ECU 60 accordingly inactivates the negative pressure pump 147 (step S135).

The negative pressure pump 147 is activated at step S125 or at step S130 to introduce a negative pressure into the fuel tank 125. The introduced negative pressure causes the fuel vapor in the fuel tank 125 to be drawn by and adsorbed onto the canister 146. Such pressure control effectively prevents the fuel vapor in the fuel tank 125 from leaking through the filler neck 125b, while the screw cap 125c of the fuel tank 125 is removed to open the filler neck 125b for fueling or another reason. When the voltage level E of the low-voltage battery 53 is higher than the preset alert reference value Eth1, the fueling control activates the negative pressure pump 147 with the preset amount of fuel consumption for the standard fuel vapor treatment, which is supplied from the low-voltage battery 53 (see step S125). During activation of the negative pressure pump 147 with the preset amount of fuel consumption for the standard fuel vapor treatment, the voltage level E of the low-voltage battery 53 may be lowered to or below the preset alert reference value Eth1 but to be still higher than the low charge reference value Elow. In this state, the fueling control decreases the amount of power consumption supplied from the low-voltage battery 53 and activates the negative pressure pump 147 with the smaller amount of power consumption. When the voltage level E of the low-voltage battery 53 is further lowered to or below the low charge reference value Elow, the fueling control immediately stops the negative pressure pump 147. Such control enables a required voltage for restarting the hybrid vehicle 20 in the drivable state to be reserved in the low-voltage battery 53. This effectively prevents a failed start and the undrivable state of the hybrid vehicle 20 due to an insufficient voltage level of the low-voltage battery 53.

After activation of the negative pressure pump 147 at either step S125 or step S130 or after inactivation of the negative pressure pump 147 at step S135, the tank ECU 60 receives a detection signal of the lid open-close detection sensor 125d and specifies whether the lid 125e of the fuel tank 125 is closed or open (step S140). In the open state of the lid 125e, the tank ECU 60 exits from this fueling control routine. In the closed state of the lid 125e, on the other hand, the tank ECU 60 executes a fueling control termination process (step S145) before exiting from the fueling control routine. The fueling control termination process resets the fueling control execution flag F1 to 0, stops the working negative pressure pump 147, and closes the sealing solenoid valve 142. The purge solenoid valve 148 is opened according to the operating conditions of the engine 22 to introduce the fuel vapor adsorbed on the canister 146, together with the air taken in through the atmosphere conduit 144c, into the intake conduit 126 under the negative pressure. The introduced fuel vapor is then burned out with the intake air by the engine 22.

Figure 6:
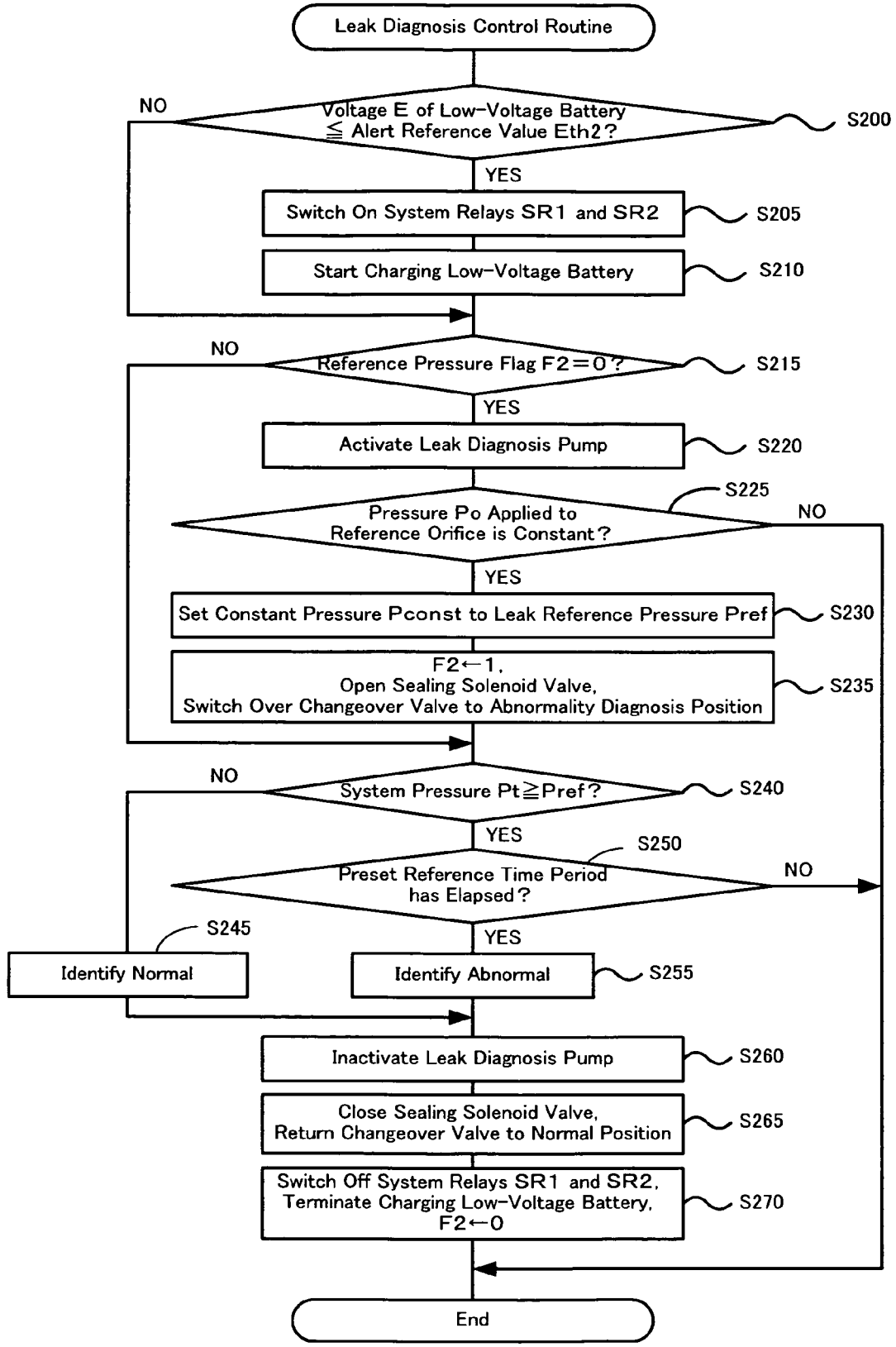
FIG. 6 is a flowchart showing a leak diagnosis control routine.

The hybrid vehicle 20 of the embodiment also has the function of leak diagnosis to detect a leak of the fuel vapor. FIG. 6 is a flowchart showing a leak diagnosis control routine executed in the hybrid vehicle 20. The tank ECU 60 executes the leak diagnosis control routine of FIG. 6 at preset timings, for example, at every several msec, after elapse of a predetermined long time since a stop of the hybrid vehicle 20. The tank ECU 60 receives a supply of electrical energy from the low-voltage battery 53 to be activated after elapse of the predetermined long time. The elapse of the predetermined long time is detected by time counting with the soak timer 61. The soak timer 61 starts counting the time in response to a switchover of the ignition switch 80 from the ON signal to the OFF signal input via the hybrid ECU 70. The predetermined long time represents a time period required for stabilizing the internal pressure of the fuel tank 125 after a stop of the hybrid vehicle 20 and may be set in a range of 4 to 5 hours. On the start of the leak diagnosis control, the changeover valve 154 included in the abnormality diagnosis module 150 is set in the normal position, and the sealing solenoid valve 142 and the purge solenoid valve 148 are both closed. In the normal position of the changeover valve 154, the canister 146 communicates with the atmosphere conduit 144c via the atmospheric communication path 154a.

In the leak diagnosis control routine of FIG. 6, the tank ECU 60 first compares the voltage level E of the low-voltage battery 53 measured by the voltage sensor 54 with a preset alert reference value Eth2 (step S200). The alert reference value Eth2 is empirically determined as a sum of the required minimum starting voltage E0 and a voltage equivalent to an amount of electric power required for the standard leak diagnosis control. When the voltage level E of the low-voltage battery 53 is not higher than the preset alert reference value Eth2 at step S200, there is a fear that immediate actuation of the leak diagnosis pump 162 decreases the voltage level E of the low-voltage battery 53 below the low charge reference value Elow. The tank ECU 60 accordingly switches on the system relays SR1 and SR2 (step S205) and drives and controls the DC-DC converter 55 to start charging the low-voltage battery 53 from the high-voltage battery 51 (step S210). Charging the low-voltage battery 53 from the high-voltage battery 51 well prevents a significant decrease in voltage level E of the low-voltage battery 53 and allows the low-voltage battery 53 to supply the required electric power to the leak diagnosis pump 162 for the leak diagnosis control.

Upon determination at step S200 that the voltage level E of the low-voltage battery 53 is higher than the preset alert reference value Eth2 or after start of charging the low-voltage battery 53 from the high-voltage battery 51 at step S210, the tank ECU 60 identifies whether a reference pressure flag F2 is equal to 0 or 1 (step S215). The reference pressure flag F2 specifies completion or non-completion of setting a leak reference pressure Pref used for the leak diagnosis control. The reference pressure flag F2 reset to 0 represents non-completion of setting the leak reference pressure Pref, whereas the reference pressure flag F2 set to 1 represents completion of setting the leak reference pressure Pref. The reference pressure flag F2 is initialized to 0.

Upon identification of the reference pressure flag F2 equal to 0 at step S215, the tank ECU 60 controls the low-voltage battery 53 to supply electric power to the leak diagnosis pump 162 included in the abnormality diagnosis module 150 and thereby activate the leak diagnosis pump 162 (step S220) The leak diagnosis pump 162 is activated to introduce a negative pressure into the bypass 157. The tank ECU 60 then determines whether a pressure Po applied to the reference orifice 159 and measured by the pressure sensor 158 is constant (step S225). In the state of the varying pressure Po, the tank ECU 60 exits from this leak diagnosis control routine. In the state of the constant pressure Po, on the other hand, the tank ECU 60 sets a constant pressure Pconst at the moment to the leak reference pressure Pref and stores the leak reference pressure Pref into the ROM of the tank ECU 60 (step S230).

Figure 7:
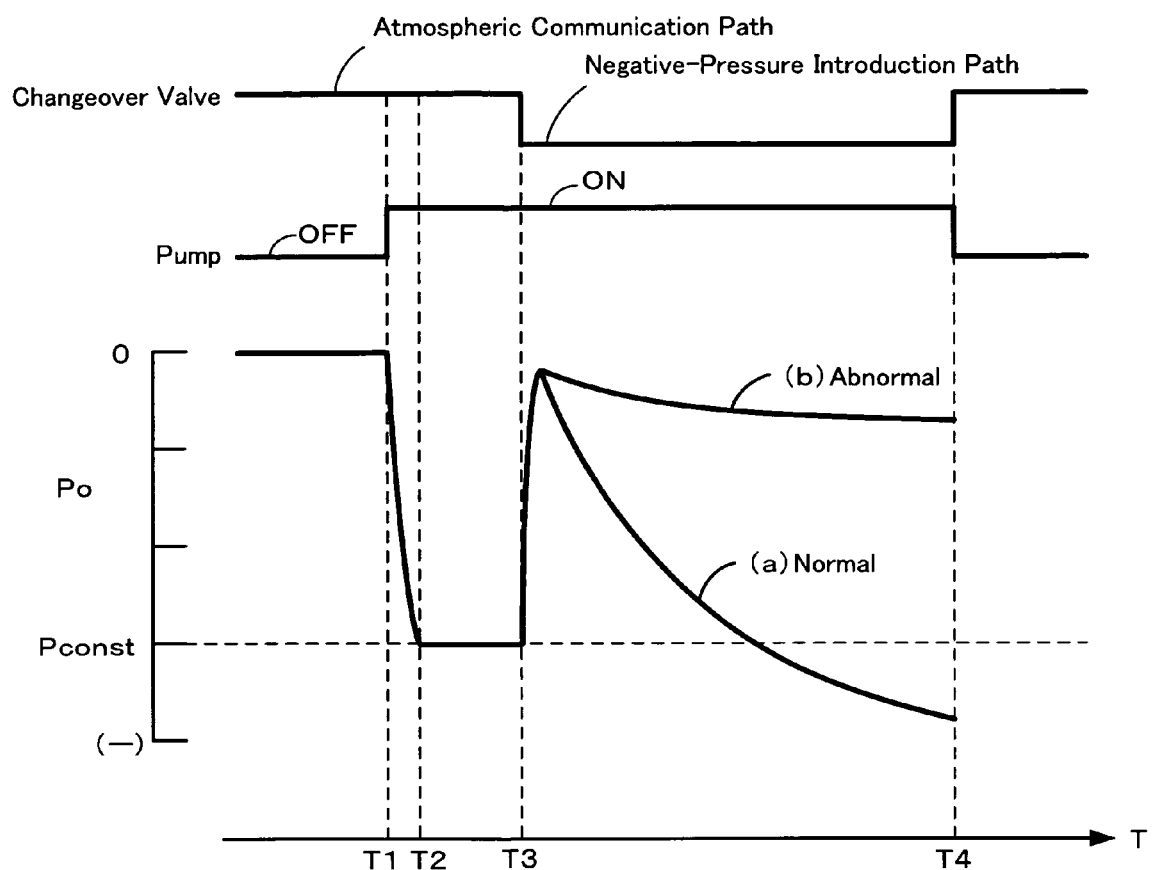
FIG. 7 is a time chart during the leak diagnosis control.

FIG. 7 is a time chart during the leak diagnosis control. At a time T1 in the time chart of FIG. 7, the leak diagnosis pump 162 is activated in the state of connection of the changeover valve 154 to the atmospheric communication path 154a. The activation of the leak diagnosis pump 162 gradually decreases the pressure Po applied to the reference orifice 159 and measured by the pressure sensor 158. The pressure Po applied to the reference orifice 159 decreases to the constant pressure Pconst and is stabilized at the constant pressure Pconst during a time period between times T2 and T3. The constant pressure Pconst is set to the leak reference pressure Pref and is used as the criterion for determining the presence or the absence of any leak hole in the fuel tank 125 as described below.

After setting and storage of the leak reference pressure Pref at step S230, the tank ECU 60 sets the reference pressure flag F2 equal to 1, controls the low-voltage battery 53 to supply electric power to open the sealing solenoid valve 142, and switches over the changeover valve 154 to the abnormality diagnosis position under activation of the leak diagnosis pump 162 (step S235). In the abnormality diagnosis position of the changeover valve 154, the canister 146 communicates with the atmosphere conduit 144c via the negative-pressure introduction path 154b. The leak diagnosis pump 162 is activated in the sealed state of the system from the fuel tank 125 to the purge solenoid valve 148 to introduce a negative pressure into the fuel tank 125, the tank conduit 144a, and the purge conduit 144b.

Upon identification of the reference pressure flag F2 equal to 1 at step S215 or after setting the reference pressure flag F2 equal to 1 at step S235, the tank ECU 60 determines whether a system pressure Pt in the system from the fuel tank 125 to the purge solenoid valve 148 is equal to or higher than the leak reference pressure Pref (step S240). When the system pressure Pt is equal to or higher than the leak reference pressure Pref at step S240, the tank ECU 60 specifies elapse or non-elapse of a preset reference time period (step S250). Upon non-elapse of the preset reference time period at step S250, the tank ECU 60 exits from the leak diagnosis control routine. Immediately after a switchover of the changeover valve 154 to the abnormality diagnosis position, the negative pressure introduced into the fuel tank 125 has not reached a sufficient level. The system pressure Pt thus does not sufficiently decrease below the leak reference pressure Pref. This leads to the affirmative answer at step S240. In the course of repetition of the leak diagnosis control routine, the affirmative answer at step S240 and the negative answer at step S250 are repeated until elapse of the preset reference time period. Unless there is any leak in the system from the fuel tank 125 to the purge solenoid valve 148, the increased negative pressure gradually decreases the system pressure Pt to be lower than the leak reference pressure Pref. This gives the negative answer at step S240. The tank ECU 60 accordingly identifies normal without any leak in the system from the fuel tank 125 to the purge solenoid valve 148 (step S245). If there is any leak in the system from the fuel tank 125 to the purge solenoid valve 148, on the other hand, the system pressure Pt does not sufficiently decrease below the leak reference pressure Pref before elapse of the preset reference time period. Namely the affirmative answer is given at step S250 during repetition of the affirmative answer at step S240. The tank ECU 60 accordingly identifies abnormal with a leak in the system from the fuel tank 125 to the purge solenoid valve 148 (step S255).

As shown by the normal curve (a) in the time chart of FIG. 7, when the system pressure Pt in the system from the fuel tank 125 to the purge solenoid valve 148 decreases below the leak reference pressure Pref in the preset reference time period between a time T3 (switchover of the changeover valve 154 from the normal position to the abnormality diagnosis position) and a time T4, the negative answer is given at step S240. In this case, the system from the fuel tank 125 to the purge solenoid valve 148 is identified normal without any leak of the fuel vapor at step S245. As shown by the abnormal curve (b) in the time chart of FIG. 7, on the other hand, when the system pressure Pt in the system from the fuel tank 125 to the purge solenoid valve 148 does not sufficiently decrease but is kept to or above the leak reference pressure Pref for the preset reference time period between the time T3 and the time T4, the affirmative answer is given at both steps S240 and S250. In this case, the system from the fuel tank 125 to the purge solenoid valve 148 is identified abnormal with a leak hole of or over the reference leak pore diameter at step S255. The presence or the absence of a leak hole of or over the reference leak pore diameter is detectable in the system from the fuel tank 125 to the purge solenoid valve 148, based on the variation in pressure measured by the pressure sensor 158. This identifies abnormality occurring in the fuel vapor treatment system 140, such as leak of the fuel vapor. Leak of the fuel vapor due to some damage or aging deterioration of the fuel tank 125, the tank conduit 144a, or the purge conduit 144b limits the decrease of the system pressure Pt with application of the introduced negative pressure. Detection of the limited pressure decrease identifies abnormality occurring in the fuel vapor treatment system 140. In this embodiment, the reference time period is determined by repeatedly and experimentally or otherwise obtaining a time period required for the decrease in system pressure Pt below the leak reference pressure Pref without any leak of the fuel vapor in the system from the fuel tank 125 to the purge solenoid valve 148 and adding some margin to the obtained time period.

Upon normal identification at step S245 or upon abnormal identification at step S255, the tank ECU 60 inactivates the leak diagnosis pump 162 (step S260) and closes the sealing solenoid valve 142 and returns the changeover valve 154 to the normal position (step S265). The tank ECU 60 then inactivates the DC-DC converter 55, switches off the system relays SR1 and SR2, terminates charging the low-pressure battery 53 from the high-pressure battery 51, and resets the reference pressure flag F2 to 0 (step S270). The leak diagnosis control routine is terminated here.

The low-voltage battery 53, the high-voltage battery 51, and the voltage sensor 54 of this embodiment respectively correspond to the accumulator unit, the charging system, and the measurement unit of the invention. The negative pressure pump 147 and the leak diagnosis pump 162 of the embodiment are equivalent to the pressure regulation mechanism of the invention. The tank ECU 60 of the embodiment corresponds to the pressure regulation control module of the invention. The low charge reference value Elow of the embodiment is equivalent to the preset low charge state of the invention. The preset alert reference value Eth1 and the preset alert reference value Eth2 of the embodiment are equivalent to the preset alert charge state of the invention. The description about the operations of the hybrid vehicle 20 of the embodiment clarifies the motor vehicle of the invention, as well as the control method of the motor vehicle.

In the hybrid vehicle 20 of the embodiment described above, when the voltage level E of the low-voltage battery 53 decreases to or below the low charge reference value Elow in the open state of the lid 125e of the fuel tank 125 for fueling or another reason, the fueling control immediately inactivates the negative pressure pump 147. Such control enables a required voltage for restarting the hybrid vehicle 20 in the drivable state to be reserved in the low-voltage battery 53. This effectively prevents a failed start and the undrivable state of the hybrid vehicle 20 due to an insufficient voltage level of the low-voltage battery 53. When the voltage level E of the low-voltage battery 53 decreases to or below the preset alert reference value Eth1 but is still higher than the low charge reference value Elow, the fueling control decreases the amount of power consumption supplied from the low-voltage battery 53 and activates the negative pressure pump 147 with the smaller amount of power consumption. Such control enables a required voltage for restarting the hybrid vehicle 20 in the drivable state to be reserved in the low-voltage battery 53 even after the fueling control.

When the voltage level E of the low-voltage battery 53 is not higher than the preset alert reference value Eth2, the leak diagnosis control switches on the system relays SR1 and SR2 and drives and controls the DC-DC converter 55 to start charging the low-voltage battery 53 from the high-voltage battery 51. This arrangement effectively prevents interruption of the leak diagnosis due to the sufficient voltage level of the low-voltage battery 53.

The system of the embodiment uses the voltage sensor 54 to measure the state of charge of the low-voltage battery 53 and does not require any additional measurement unit.

The embodiment discussed above is to be considered in all aspects as illustrative and not restrictive. There may be many modifications, changes, and alterations without departing from the scope or spirit of the main characteristics of the present invention. Some examples of possible modification are given below.

One possible modification may provide an additional step between steps S135 and S140 in the fueling control routine of the embodiment shown in FIG. 5. The additional step keeps charging the low-voltage battery 53 until an increase in voltage level E of the low-voltage battery 53 above the preset alert reference value Eth1. This modified fueling control thus interrupts the operation of the negative pressure pump 147 and allows resumption of the operation of the negative pressure pump 147 only after a sufficient increase in voltage level E of the low-voltage battery 53.

Figure 8:
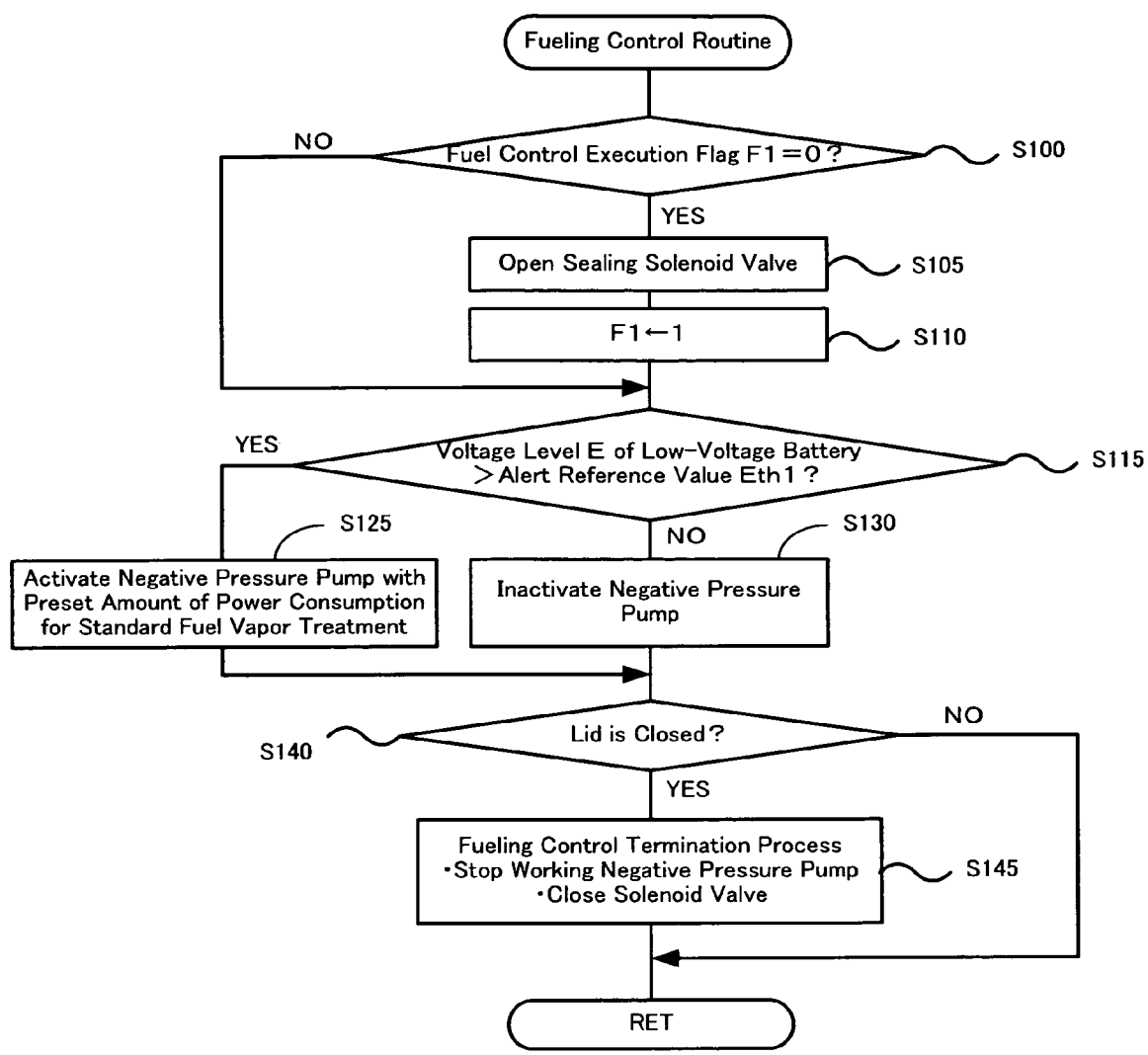
FIG. 8 is a flowchart showing a fueling control routine in one modified structure.

Another possible modification may omit the processing of steps S120 and S130 from the fueling control routine of the embodiment shown in FIG. 5. This modification is shown in the flowchart of FIG. 8. When the voltage level E of the low-voltage battery 53 is not higher than the preset alert reference value Eth1 at step S115, the modified fueling control of FIG. 8 immediately stops the supply of electric power from the low-voltage battery 53 to the negative pressure pump 147 to inactivate the negative pressure pump 147 (step S135). The alert reference value Eth1 is determined as the sum of the required minimum starting voltage E0 and the voltage equivalent to the amount of electric power required for the standard fuel vapor treatment. The modified fueling control does not execute the fuel vapor treatment under the condition that the voltage level E of the low-voltage battery 53 is decreased to or below the preset alert reference value Eth1. This effectively enables the required minimum starting voltage E0 to be reserved for restarting the hybrid vehicle 20 in the normal drivable state.

Figure 9:
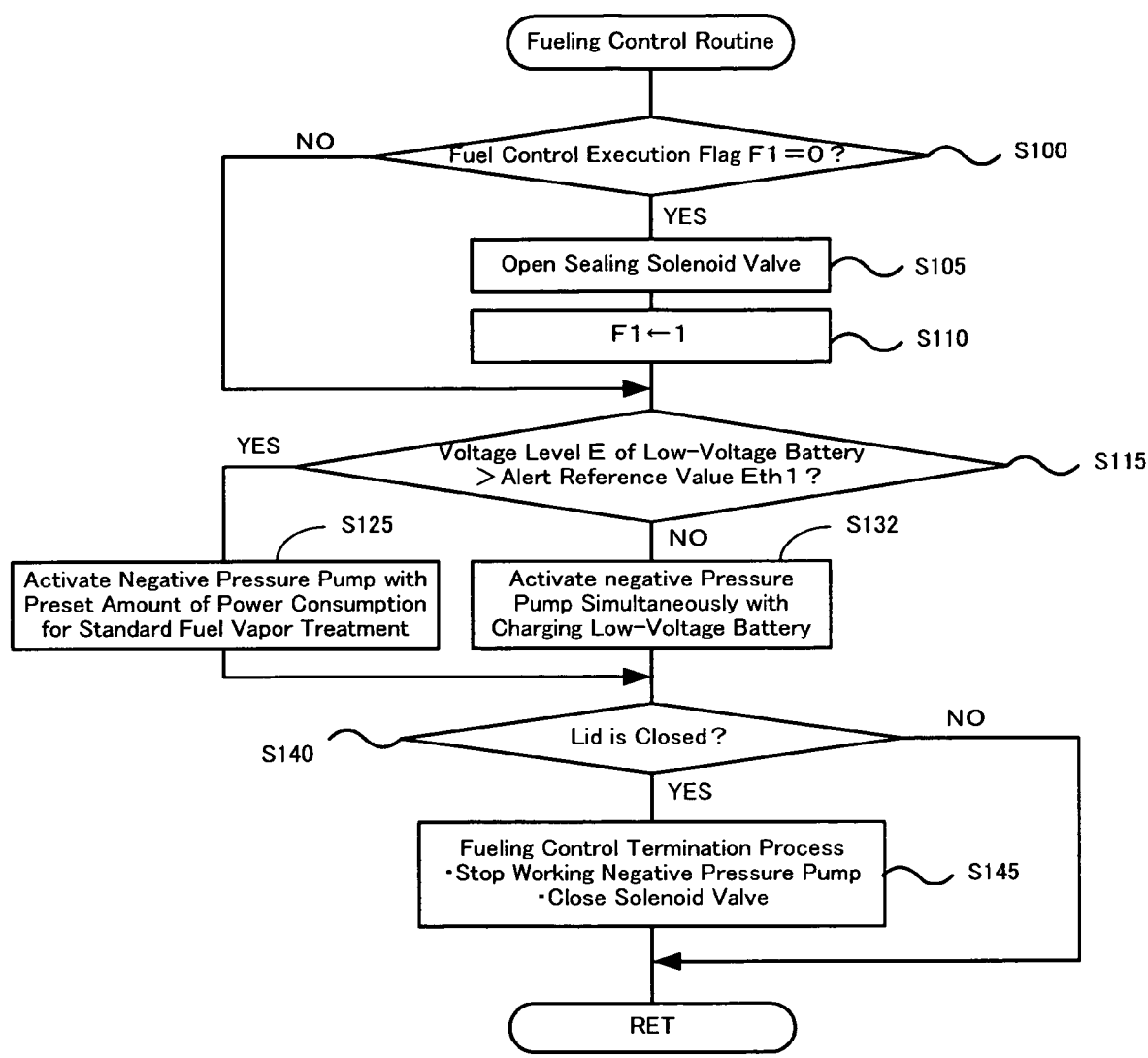
FIG. 9 is a flowchart showing a fueling control routine in another modified structure.

The modified fueling control routine of FIG. 8 inactivates the negative pressure pump 147 at step S135, when the voltage level E of the low-voltage battery 53 is not higher than the preset alert reference value Eth1 at step S115. Another possible modification of the fueling control may activate the negative pressure pump 147 simultaneously with charging the low-voltage battery 53, when the voltage level E of the low-voltage battery 53 is not higher than the preset alert reference value Eth1. This modification is shown in the flowchart of FIG. 9. When the voltage level E of the low-voltage battery 53 is not higher than the preset alert reference value Eth1 at step S115, the modified fueling control of FIG. 9 switches on the system relays SR1 and SR2, drives and controls the DC-DC converter 55 to start charging the low-voltage battery 53 from the high-voltage battery 51, and simultaneously activates the negative pressure pump 147 with the preset amount of fuel consumption for the standard fuel vapor treatment (step S132). This modified fueling control enables the fuel vapor treatment throughout the fueling. The charging degree of the low-voltage battery 53 from the high-voltage battery 51 is preferably set to prevent a significant decrease of the low-voltage battery 53 by the supply of electric power to the negative pressure pump 147. In the modified fueling control routine of FIG. 9, the comparison between the voltage level E of the low-voltage battery 53 and the preset alert reference value Eth1 at step S115 may be replaced by comparison between the voltage level E of the low-voltage battery 53 and the low charge reference value Elow. Activation of the negative pressure pump 147 simultaneously with charging the low-voltage battery 53 at step S132 may be replaced by activation of the negative pressure pump 147 after completion of charging the low-voltage battery 53 above the preset alert reference value Eth1.

The leak diagnosis control routine of the embodiment shown in FIG. 6 determines whether the voltage level E of the low-voltage battery 53 is not higher than the preset alert reference value Eth2 at step S200. One modified flow of the leak diagnosis control may determine whether the voltage level E of the low-voltage battery 53 is not higher than the low charge reference value Elow.

In the fueling control routine of the embodiment, the changeover valve 154 included in the abnormality diagnosis module 150 is set in the normal position, when the sealing solenoid valve 142 is opened at step S105. The changeover valve 154 may alternatively be set in the abnormality diagnosis position, when the sealing solenoid valve 142 is opened at step S105.

The above embodiment regards application of the invention to the hybrid vehicle 20. The technique of the invention is, however, not restricted to such hybrid vehicles but is also applicable to conventional engine vehicles driven with an engine. In the latter application, the alert reference value Eth1 may be set to, for example, a required voltage of actuating a starter motor for starting the engine.

The present invention claims benefit of the priority from Japanese Patent Application No. 2005-078803 filed on Mar. 18, 2005, the entire contents of which are incorporated by reference herein.

INDUSTRIAL APPLICABILITY

The technique of the invention is applicable to vehicle-related industries including automobile industries.

The invention claimed is:

1. A control method of a motor vehicle, said motor vehicle being equipped with a fuel tank that stores a fuel; an accumulator unit that is charged with electric power and discharges electric power; and a pressure regulation mechanism that receives a supply of electric power from the accumulator unit and regulates an internal pressure of the fuel tank with the received supply of electric power, said control method comprising the steps of:
(a) measuring a state of charge of the accumulator unit on a start of or in the course of the regulation of the internal pressure of the fuel tank by the pressure regulation mechanism; and
(b) controlling the regulation of the internal pressure of the fuel tank by the pressure regulation mechanism, based on the state of charge of the accumulator unit measured in said step (a).

2. A control method of a motor vehicle, said motor vehicle being equipped with a fuel tank that stores a fuel; an accumulator unit that is charged with electric power and discharges electric power; a pressure regulation mechanism that receives a supply of electric power from the accumulator unit and regulates an internal pressure of the fuel tank with the received supply of electric power; and a charging system that is capable of charging the accumulator unit, said control method comprising the steps of:
(a) measuring a state of charge of the accumulator unit on a start of or in the course of the regulation of the internal pressure of the fuel tank by the pressure regulation mechanism; and
(b) controlling the regulation of the internal pressure of the fuel tank by the pressure regulation mechanism and the charging of the accumulator unit by the charging system, based on the state of charge of the accumulator unit measured in said step (a).

3. A motor vehicle, comprising:
an internal combustion engine;
a fuel tank that stores a fuel, which is to be combusted by the internal combustion engine;
an accumulator unit that accumulates electrical energy therein;
a measurement unit that measures a state of charge of the accumulator unit;
a pressure regulation mechanism that receives a supply of electrical energy from the accumulator unit and regulates an internal pressure of the fuel tank with the received supply of electrical energy; and
a pressure regulation control module that controls the regulation of the internal pressure of the fuel tank by the pressure regulation mechanism, based on the state of charge of the accumulator unit measured by the measurement unit on a start of or in the course of the pressure regulation by the pressure regulation mechanism.

4. A motor vehicle in accordance with claim 3, wherein said pressure regulation control module controls the pressure regulation by the pressure regulation mechanism, in order to apply a negative pressure into the fuel tank at a time of supply of the fuel to the fuel tank.

5. A motor vehicle in accordance with claim 3, wherein said pressure regulation control module controls the pressure regulation by the pressure regulation mechanism, in order to apply a negative pressure into the fuel tank when said motor vehicle stops in an undrivable state for a preset long time period.

6. A motor vehicle in accordance with claim 3, wherein the state of charge of the accumulator unit represents a voltage level of the accumulator unit, and
the measurement unit comprises a voltage sensor that measures the voltage level of the accumulator unit.

7. A motor vehicle in accordance with claim 3, wherein said pressure regulation control module controls the pressure regulation by the pressure regulation mechanism, in order to keep the state of charge of the accumulator unit higher than a preset low charge state.

8. A motor vehicle in accordance with claim 7, wherein the preset low charge state represents a low charge level that does not make said motor vehicle in a drivable state on a start of said motor vehicle.

9. A motor vehicle in accordance with claim 7, wherein when the state of charge of the accumulator unit measured by the measurement unit decreases below a preset alert charge state, which is higher than the preset low charge state, said pressure regulation control module lowers the electrical energy supplied from the accumulator unit to the pressure regulation mechanism and controls the pressure regulation mechanism to regulate the internal pressure of the fuel tank with the lowered supply of electrical energy.

10. A motor vehicle in accordance with claim 9, wherein the preset alert charge state represents a total state of charge as a sum of the preset low charge state and an amount of electrical energy required for the regulation of the internal pressure of the fuel tank.

11. A motor vehicle in accordance with claim 7, wherein when the state of charge of the accumulator unit measured by the measurement unit decreases below a preset alert charge state, which is higher than the preset low charge state, or decreases to the preset low charge state, said pressure regulation control module controls the pressure regulation mechanism to stop the pressure regulation.

12. A motor vehicle in accordance with claim 11, wherein the preset alert charge state represents a total state of charge as a sum of the preset low charge state and an amount of electrical energy required for the regulation of the internal pressure of the fuel tank.

13. A motor vehicle, comprising:
an internal combustion engine;
a fuel tank that stores a fuel, which is to be combusted by the internal combustion engine;
an accumulator unit that accumulates electrical energy therein;
a measurement unit that measures a state of charge of the accumulator unit;
a pressure regulation mechanism that receives a supply of electrical energy from the accumulator unit and regulates an internal pressure of the fuel tank with the received supply of electrical energy;
a charging system that is capable of charging the accumulator unit; and
a pressure regulation control module that controls the regulation of the internal pressure of the fuel tank by the pressure regulation mechanism and the charging of the accumulator unit by the charging system, based on the state of charge of the accumulator unit measured by the measurement unit on a start of or in the course of the pressure regulation by the pressure regulation mechanism.

14. A motor vehicle in accordance with claim 13, wherein the charging system comprises a high-voltage power source used to drive said motor vehicle, and
the accumulator unit comprises a low-voltage power source.

15. A motor vehicle in accordance with claim 13, wherein said pressure regulation control module controls the pressure regulation by the pressure regulation mechanism, in order to apply a negative pressure into the fuel tank at a time of supply of the fuel to the fuel tank.

16. A motor vehicle in accordance with claim 13, wherein said pressure regulation control module controls the pressure regulation by the pressure regulation mechanism, in order to apply a negative pressure into the fuel tank when said motor vehicle stops in an undrivable state for a preset long time period.

17. A motor vehicle in accordance with claim 13, wherein the state of charge of the accumulator unit represents a voltage level of the accumulator unit, and
the measurement unit comprises a voltage sensor that measures the voltage level of the accumulator unit.

18. A motor vehicle in accordance with claim 13, wherein said pressure regulation control module controls the pressure regulation by the pressure regulation mechanism and the charging of the accumulator unit by the charging system, in order to keep the state of charge of the accumulator unit higher than a preset low charge state, on termination of the pressure regulation by the pressure regulation mechanism.

19. A motor vehicle in accordance with claim 18, wherein when there is a possibility that the state of charge of the accumulator unit decreases to or below the preset low charge state, said pressure regulation control module controls the pressure regulation mechanism and the charging system to regulate the internal pressure of the fuel tank simultaneously with charging the accumulator unit.

20. A motor vehicle in accordance with claim 18, wherein when there is a possibility that the state of charge of the accumulator unit decreases to or below the preset low charge state, said pressure regulation control module controls the pressure regulation mechanism and the charging system to interrupt the pressure regulation, start charging the accumulator unit, and allow resumption of the pressure regulation after completion of the charging.

21. A motor vehicle in accordance with claim 18, wherein the preset low charge state represents a low charge level that does not make said motor vehicle in a drivable state on a start of said motor vehicle.

* * * * *